(No Model.)
D. DEMERS.
COLTER CLEARER.
No. 449,669. Patented Apr. 7, 1891.
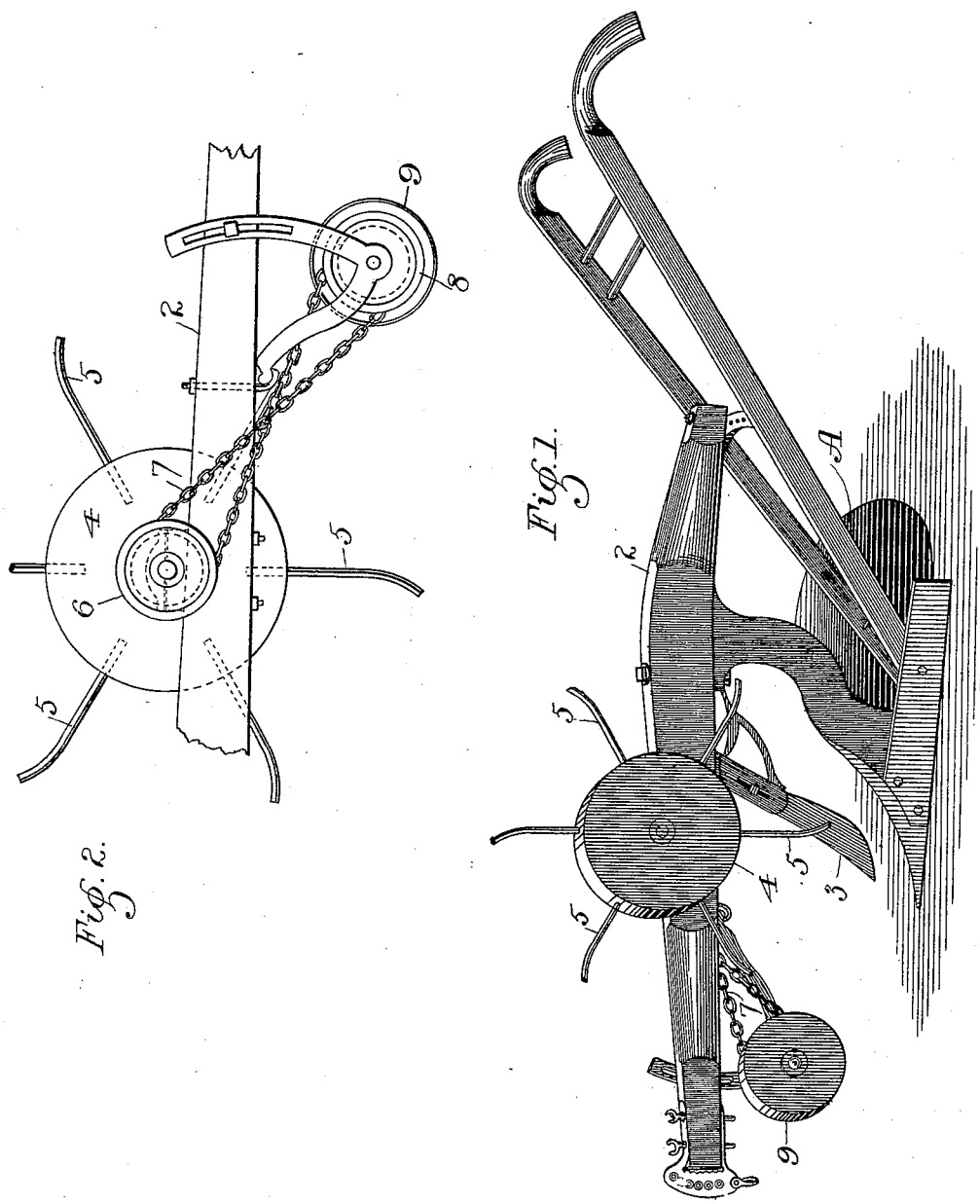
Witnesses:—
C. L. Caldwell.
A. Mac Welch
Inventor:—
Dominique Demers,
per Paul ?
Attorneys.

UNITED STATES PATENT OFFICE.

DOMINIQUE DEMERS, OF HOLTON, WISCONSIN.

COLTER-CLEARER.

SPECIFICATION forming part of Letters Patent No. 449,669, dated April 7, 1891.

Application filed November 18, 1890. Serial No. 371,811. (No model.)

*To all whom it may concern:*

Be it known that I, DOMINIQUE DEMERS, of Holton, St. Croix county, Wisconsin, have invented certain Improvements in Colter-Clearers, of which the following is a specification.

My invention relates to improvements in attachments to ordinary plows, its object being to provide means for keeping a path clear in front of the colter and plow and to prevent clogging by stubble or other loose material; and it consists in arranging upon the plow-beam a wheel carrying tines or spokes which is driven from the lead-wheel of the plow and in the opposite direction from said wheel, the tines passing near the surface of the ground in front of the colter and throwing forward any obstacle in the way.

My invention further consists in the construction and combination hereinafter described, and particularly pointed out in the claims.

In the accompanying drawings, forming part of this specification, Figure 1 is a perspective view of the hand-plow fitted with my improved attachments, and Fig. 2 is a partial side elevation showing the means for operating the attachment.

In the drawings, A represents the plow, which may be of any desired type.

Journaled preferably upon the top of the beam 2 slightly forward of the colter 3 is the clearer-wheel 4, extending downward on the landside of the beam. It is constructed preferably with a wooden disk, from the periphery of which extend tines or spokes 5, slightly bent near their extremities in the opposite direction from that of the rotation of the wheel when in use.

Rigidly secured to the wheel 4 is the grooved sheave 6, upon which is arranged the chain 7, extending also around a similar grooved sheave 8, rigidly connected to the lead-wheel 9 of the plow, and by means of which the wheel 4 is driven, the chain being crossed, as shown best in Fig. 2, so that the sheave 6 is caused to rotate in an opposite direction from that of the lead-wheel. It will thus be seen that when the plow is in use with the lead-wheel 9 rolling upon the surface of the ground the clearer-wheel 4 is caused to rotate in the opposite direction and the tines are carried downward and forward past and in front of the colter, thus throwing aside any loose material which would tend to clog it, the backward bend of the tines allowing straw or other similar material to slide off them as the wheel 4 rotates.

I claim—

1. A colter-clearer comprising, in combination, a clearer-wheel arranged in a vertical position on the landside of the plow-beam and journaled upon said beam, tines projecting from the periphery of said wheel and carried by the rotation of the wheel close to the surface of the ground, a grooved sheave upon the shaft of said wheel, a grooved sheave upon the lead-wheel of the plow, and a chain passing over said sheaves, by means of which said clearer-wheel is rotated by and in an opposite direction from said lead-wheel, substantially as described.

2. The combination, with a plow, of a wooden disk-wheel 4, journaled upon the plow-beam, the tines 5, projecting from the periphery of said wheel and extending approximately to the surface of the ground beneath, the grooved sheave 6, rigidly secured to the shaft of said wheel, the grooved sheave 8, rigidly secured to the lead-wheel 9, and the crossed chain 7, arranged upon said sheaves and adapted to drive said wheel 4 from said lead-wheel, substantially as described.

In testimony whereof I have hereunto set my hand this 14th day of November, 1890.

DOMINIQUE DEMERS.

In presence of—
T. D. MERWIN,
A. MAE WELCH.